Nov. 8, 1938. A. KRIEG 2,135,720

THERMOCOUPLE WELL

Filed Aug. 26, 1936

Alfred Krieg
INVENTOR

BY Myron J. Burkhard
ATTORNEY

Patented Nov. 8, 1938

2,135,720

UNITED STATES PATENT OFFICE 2,135,720

THERMOCOUPLE WELL

Alfred Krieg, Woodbury, N. J., assignor to Socony Vacuum Oil Company, Incorporated, New York, N. Y., a corporation of New York Application August 26, 1936, Serial No. 97,888

1 Claim. (Cl. 136—4)

This invention is directed to an improvement in thermocouple wells, particularly in those wells designed for installation in the tubes of heaters wherein petroleum oils are raised to high temperatures for the purpose of cracking, extensive distillation and the like.

Thermocouple wells consist of a tube, sealed at its internal end, in which the hot junction thermocouple elements are mounted. The outboard end of the tube is enlarged and threaded or otherwise equipped so that it may be mounted securely in some type of socket or fitting, which fitting is mounted in or exists as a portion of the wall defining the container for the material whose temperature is to be measured. In the tubes of oil heaters, these wells are customarily mounted in the plugs, or take the place of the plugs which close the return bend fitting whereby the tube is reversed in a U bend, to again pass through the furnace.

Figure 1:
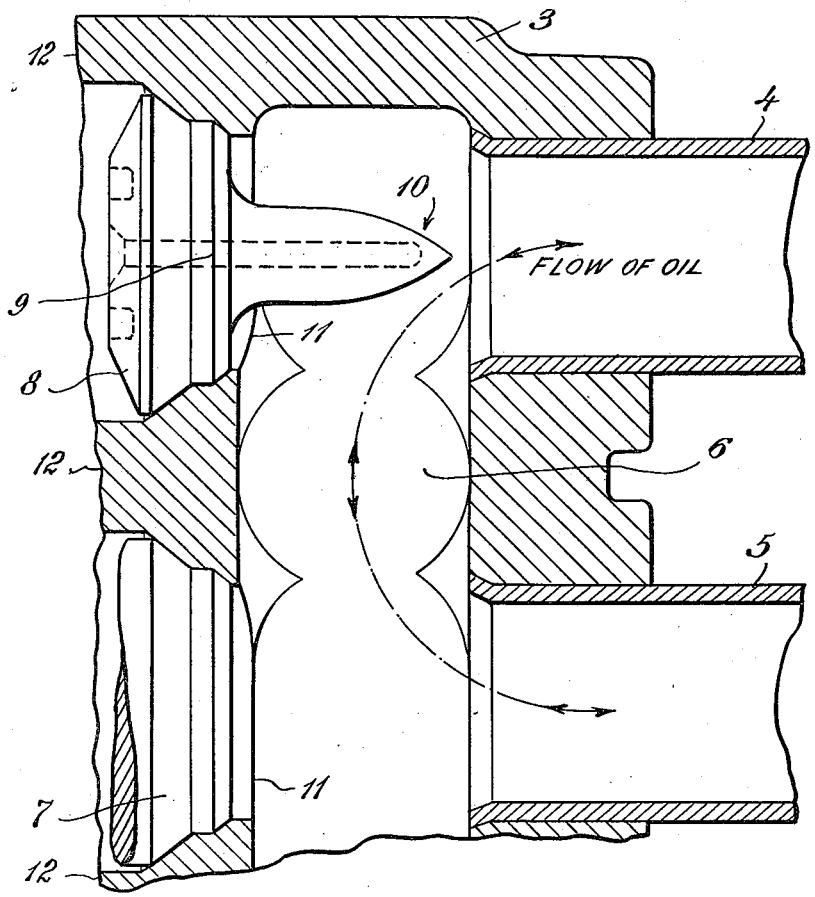
Figure 2:
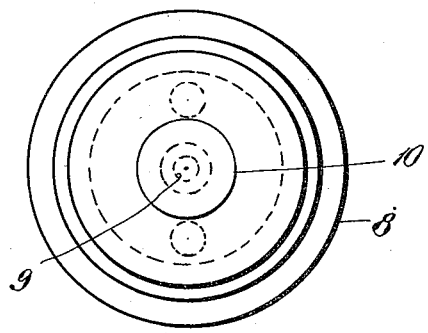

To illustrate my improved type of thermocouple well, reference is made to the drawing attached hereto, which shows in Figure 1 a partial section of the usual return bend with thermocouple well and in Figure 2 an end view of the thermocouple well.

Referring to Figure 1, the general fitting, termed a return bend, consists of a forging 3, into two apertures of which are rolled tubes 4 and 5, communication between the tubes being established by internal passage 6 in forging 3. Access is had to the interior of the forging and tubes for cleaning and inspection when not in service, by orifices 11, which, when in operation, are closed by plugs such as shown at 7. These plugs are held in place against the high interior pressures by some form of key or other locking device supported by the extended lugs of the forging 3, which lugs are indicated by numerals 12. The specific form of the plug, lugs, and locking devices have nothing to do with this invention and are not shown on the drawing. The flow of the oil is as indicated by the curved line, and may be in either direction, as indicated by the arrows thereon. The temperature of the oil flowing in the tubes is measured by a thermocouple inserted in a thermocouple well 8, the outer end of which is enlarged and formed to duplicate the form of the plug 7 so that it may fit the same socket and be held by the same locking device, whatever that may be. The thermocouple well 8 has an internal passage 9 to receive the thermocouple wires or couple, and terminates at the inboard end in a sharpened form 10. It is the form of this inboard end of the thermocouple well in which my invention specifically resides. So far as I am aware, the inboard end of such devices has always been made of a hemispherical or hemispheroidical form. I have made it of a taper of gradually accelerating degree, terminating in a point.

As might be expected, this new form has some slight effect on the pressure drop of the oil flowing through the still. But with three or four such thermowells per furnace, the advantage to be gained from this amounts only to a few pounds per square inch in a total pressure drop which is frequently hundreds of pounds per square inch. I have found, however, that other totally new and totally unexpected benefits flow from the use of this new type of thermowell. Old types of thermowells were troubled by pitting, corrosion and erosion, affected by the surrounding hot oil, and one of the frequent causes of furnace shutdowns was thermowell failure from such causes. Thermowells of my new type have almost entirely done away with failures from these causes. Another common fault of thermowells of the old type was the very great tendency of coke to collect on the thermowell and in adjacent portions of the apparatus at a rate very much in excess of the rate of collection at other points. This frequently caused the shutdown of a furnace because of coke in a return bend adjacent a thermowell long before the apparatus as a whole required cleaning. Such shutdowns create an expense for lost time beside which the value of a thermowell is negligible. I have found that my improved type of thermowell construction almost completely does away with trouble from this source as well. Additionally, collection of coke upon thermowells of the old shape has destroyed the accuracy of their indications, since the coke deposit is insulating in character, erratic in its manner of deposition, prone to build up for a time and then break off, and at all times bringing into the reading of temperature a variable element, unknown in quality and erratic in quantity. I have found that my improved type of thermowell construction gives readings of greater accuracy comparable in amount from time to time, and not subject to erratic variation when other variables were unchanged, as was usually the case with thermocouples installed in thermowells of prior forms. When it is realized that serious changes in the operating characteristics of an oil heating unit, length of run thereof, and character of product therefrom may be obtained by changes of relatively few degrees in temperature, it is seen how valuable is the increased accuracy obtained by my new form of thermowell.

I claim:

A thermocouple well adapted for insertion in a fitting containing flowing hot oil or fluid under pressure, characterized by having the end of the well which is inserted in the fluid externally formed as a cylinder with a gradually accelerating degree of taper, terminating in a point.

ALFRED KRIEG.